(12) United States Patent
Robinson

(10) Patent No.: US 11,021,016 B2
(45) Date of Patent: Jun. 1, 2021

(54) BRAIDED TIRE MATERIAL

(71) Applicant: Bridgestone Americas Tire Operations, LLC, Nashville, TN (US)

(72) Inventor: Albert H. Robinson, Franklin, TN (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 298 days.

(21) Appl. No.: 15/945,105

(22) Filed: Apr. 4, 2018

(65) Prior Publication Data

US 2018/0297409 A1  Oct. 18, 2018

Related U.S. Application Data

(60) Provisional application No. 62/486,261, filed on Apr. 17, 2017.

(51) Int. Cl.
| | |
|---|---|
| *D04C 1/12* | (2006.01) |
| *B60C 9/00* | (2006.01) |
| *D07B 1/06* | (2006.01) |
| *D07B 1/16* | (2006.01) |
| *B60C 9/22* | (2006.01) |

(Continued)

(52) U.S. Cl.
CPC .......... *B60C 9/0028* (2013.01); *B60C 9/0007* (2013.01); *B60C 9/2204* (2013.01); *D02G 3/48* (2013.01); *D04C 1/12* (2013.01); *D07B 1/0606* (2013.01); *D07B 1/0613* (2013.01); *D07B 1/162* (2013.01); *B60C 2009/0092* (2013.01); *B60C 2009/2038* (2013.01); *B60C 2009/2214* (2013.01); *D07B 2201/1096* (2013.01); *D07B 2205/3025* (2013.01); *D07B 2401/201* (2013.01); *D07B 2501/2046* (2013.01); *D10B 2505/12* (2013.01)

(58) Field of Classification Search
CPC .......... B60C 9/0028; B60C 2009/0092; D07B 1/0606; D07B 1/0613; D07B 2201/1096
See application file for complete search history.

(56) References Cited

U.S. PATENT DOCUMENTS

| | | |
|---|---|---|
| 3,449,199 A | 6/1969 | Mead |
| 3,634,972 A | 1/1972 | Illman |
| 4,201,260 A | 5/1980 | Mirtain et al. |

(Continued)

FOREIGN PATENT DOCUMENTS

| | | |
|---|---|---|
| EP | 0 248 164 A2 | 12/1987 |
| EP | 2 065 226 A1 | 6/2009 |

(Continued)

OTHER PUBLICATIONS

JP2014084065 Ishii Hidekazu Translation (Year: 2014).*

(Continued)

*Primary Examiner* — Jacob T Minskey
*Assistant Examiner* — Adrien J Bernard
(74) *Attorney, Agent, or Firm* — Shaun J. Fox; Terry W. Kramer

(57) ABSTRACT

The various embodiments relate to pneumatic tires including a cap ply of braided strands of yarn. Various embodiments relate to strands of yarn that are fiberglass filaments or steel. The braided strands may include a tight braid or a loose braid. Various embodiments include braids having 1 to 5 stitches per cm.

15 Claims, 2 Drawing Sheets

(51) Int. Cl.
*D02G 3/48* (2006.01)
*B60C 9/20* (2006.01)

(56) References Cited

U.S. PATENT DOCUMENTS

| | | |
|---|---|---|
| 4,220,497 A | 9/1980 | Carley |
| 5,407,701 A | 4/1995 | Reuter |
| 6,855,423 B2 | 2/2005 | Fidan et al. |
| 9,199,416 B2 | 12/2015 | Ayyildiz |
| 2011/0220263 A1 | 9/2011 | Michiels |

FOREIGN PATENT DOCUMENTS

| | | | |
|---|---|---|---|
| GB | 0248164 | * 12/1987 | ............... B60C 9/18 |
| JP | 9-193610 A | 7/1997 | |
| JP | 2014-84065 A | 5/2014 | |
| WO | 1992009844 | 6/1992 | |

OTHER PUBLICATIONS

Vert, "Reinforcing Materials in Rubber Products", Nokian Tyres PLC, 114 pages.
European Search Report dated Oct. 26, 2018 in connection with EP Application No. 18 16 5738.

* cited by examiner

FIG. 1
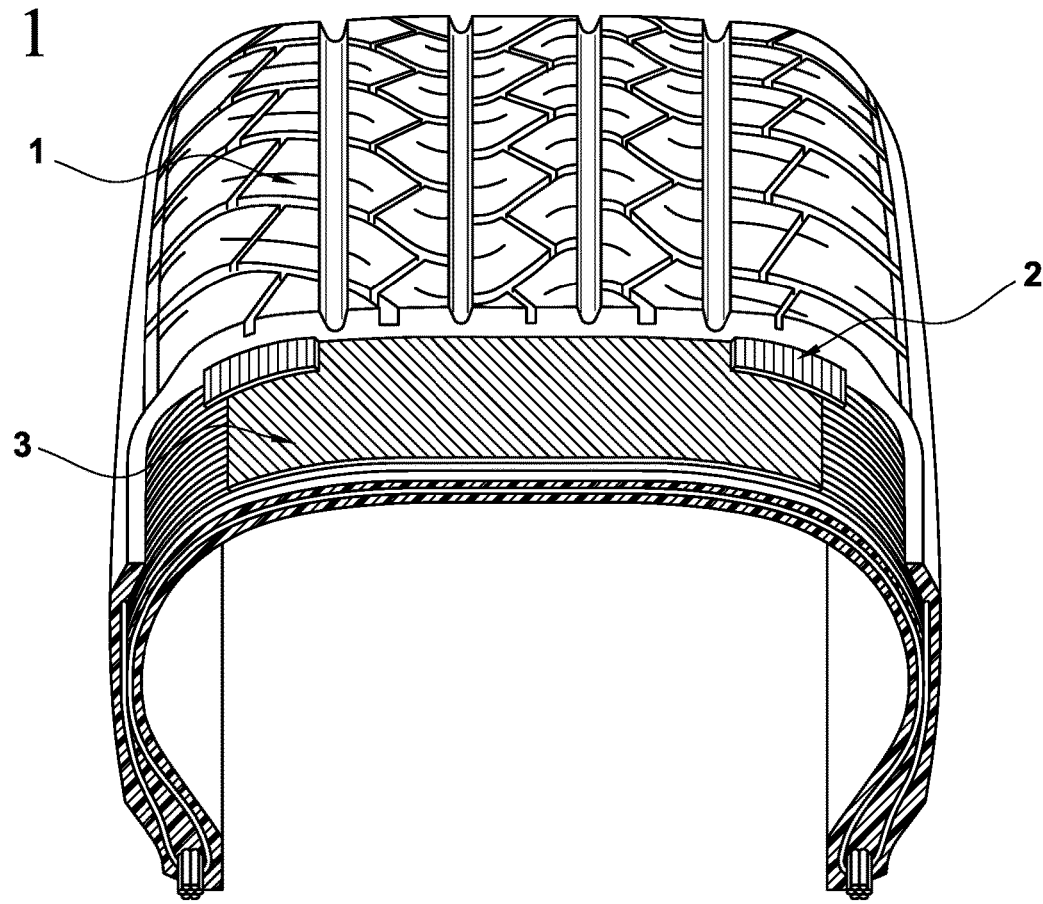
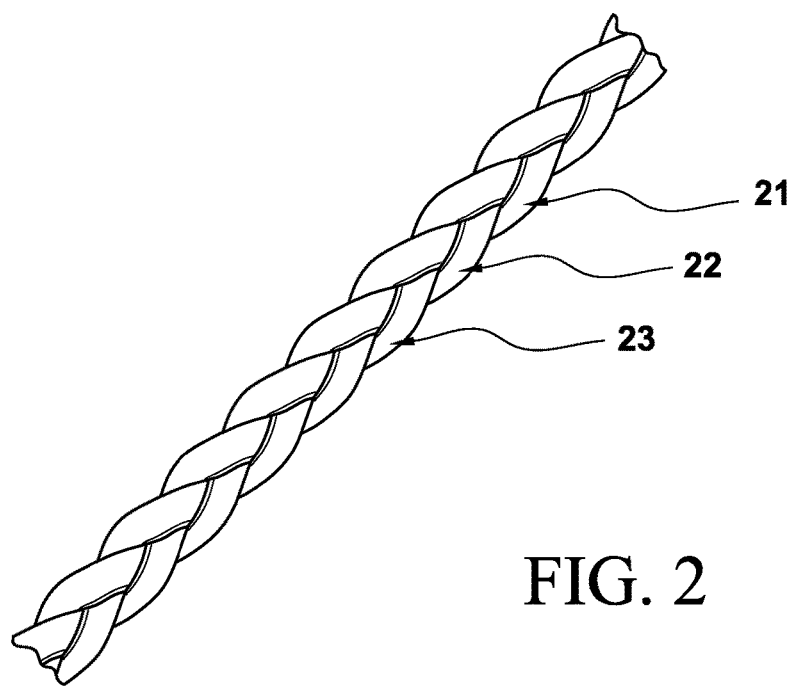
FIG. 2

BRAIDED TIRE MATERIAL

CROSS-REFERENCE TO RELATED APPLICATION

This application claims priority to U.S. Provisional Patent Application No. 62/486,261, filed on Apr. 17, 2017, the disclosure of which is incorporated by reference herein in its entirety.

TECHNICAL FIELD

Various embodiments disclosed herein relate generally to braided materials for a tire.

BACKGROUND

Some rubber tires are manufactured having a cap ply underneath the tire tread. The cap ply provides stability and durability to tires, such as high speed tires. Tire production requires a cap ply that may be elongated as production of the tire requires expansion. The tire tread is expanded around inner components of the tire. Thus, the inner components line the inside of the tread to provide support and must expand with the tread.

Generally, the cap ply includes nylon yarns in a calendared fabric. The nylon is twisted into a spiral wrap that is further woven together and treated to provide a suitable fabric material. Once the fabric is calendared, it is cut into widths for application to a tire. The process is time consuming and costly. The process also produces waste at its various steps.

The nylon cap ply may lead to flat spotting where a tire sits for a prolonged period of time or in cold weather. Flat spotting describes a tire having flattened portions such that the tire is not perfectly round. The nylon cap ply with a flat spot returns to its prior, round shape after the tire is driven. Stronger materials, when used in tires, may provide improved tire durability and avoid flattening but are substantially non-elastic and do not exhibit substantial elongation. Plies formed with substantially non-elastic materials would not expand with the tread and the tires would be deformed and rendered inoperable. There exists a need for operable tires with a reduced risk of flat spotting.

SUMMARY

A brief summary of various exemplary embodiments is presented. Some simplifications and omissions may be made in the following summary, which is intended to highlight to introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments disclosed herein relate to a pneumatic tire that includes a tread and at least one layer adjacent to the tread, wherein the layer is at least one cord of braided strands of yarn of a substantially non-elastic material, wherein the braided strands of yarn cross each other in alternating, opposing directions.

Various embodiments disclosed herein relate to a pneumatic tire wherein the layer is a cap ply.

Various embodiments disclosed herein relate to a pneumatic tire wherein the layer is at least one edge cover.

Various embodiments disclosed herein relate to a pneumatic tire that includes strands of yarn that are fiberglass filaments. Various embodiments disclosed herein relate to a pneumatic tire that includes strands of yarn that are steel.

Various embodiments disclosed herein relate to a pneumatic tire that includes cords that are coated with a cement or rubber composition.

Various embodiments disclosed herein relate to a pneumatic tire that includes a cord having 3 or 4 braided strands of yarn.

Various embodiments disclosed herein relate to a pneumatic tire that includes a cord having about 1 to about 5 stitches per cm. Various embodiments disclosed herein relate to a pneumatic tire that includes a cord having about 1 to about 3.14 stitches per cm.

Various embodiments disclosed herein relate to a pneumatic tire that includes a cord that is not woven.

Various embodiments disclosed herein relate to a pneumatic tire having cords that are extruded with additional cords. Various embodiments disclosed herein relate to a pneumatic tire having from 3 to 8 cords extruded together. Various embodiments disclosed herein relate to a pneumatic tire having from 5 to 6 cords extruded together. Various embodiments include a pneumatic tire having extruded cords in a width from about 10 mm to about 15 mm. Various embodiments include a pneumatic tire having extruded cords in a width of about 12 mm.

Various embodiments disclosed herein relate to a pneumatic tire that includes a tread and at least one layer adjacent to the tread, wherein the layer includes at least one sheet. The sheet includes more than one cord of braided strands of yarn of a substantially non-elastic material, wherein the braided strands of yarn cross each other in alternating, opposing directions.

Various embodiments disclosed herein relate to a pneumatic tire having a sheet including 3 to 8 cords that are extruded together. Various embodiments include a sheet with 5 to 6 cords. Various embodiments include a sheet having a width from about 10 mm to about 15 mm. Various embodiments include a sheet having a width of about 12 mm.

BRIEF DESCRIPTION OF THE DRAWINGS

In order to better understand various exemplary embodiments, reference is made to the accompanying drawings, wherein:

FIG. 1 shows a cutaway view of a pneumatic tire.
FIG. 2 shows a braided cord.

DETAILED DESCRIPTION

Figure 3:
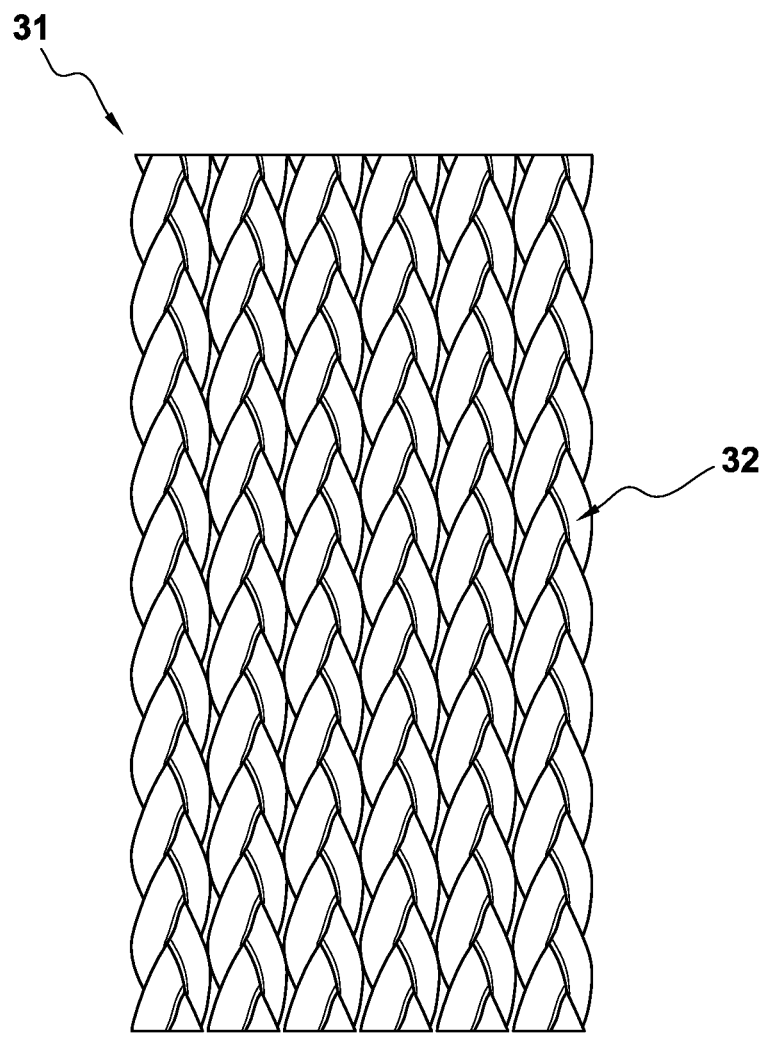
FIG. 3 shows a sheet of braided cords.

The description and drawing presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

The following includes definitions of selected terms employed herein. The definitions include various examples and/or forms of components that fall within the scope of a term. The examples are not intended to be limiting.

"Tread" refers to that portion of the tire that comes into contact with a surface under normal load.

"Braid" refers to a pattern formed by strands of yarn that includes the strands crossing over one another in alternating, opposing directions.

"Stitch" refers to the occurrence of a strand of yarn crossing over other strands of yarn in a braid.

Directions are stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

A substantially non-elastic material refers to a material that does not demonstrate substantial elongation, i.e. does not substantially stretch. Non-elastic materials are distinguishable from flexible materials, which allow flex, but do not deform under pressure.

The embodiments described herein provide for tires having improved longevity and reduced risk of flat spotting, improving performance. The tire will further decrease waste and production processes, reducing manufacturing costs. Various embodiments replace a nylon cap ply with a stronger material that has been braided. The stronger braided material may not set when resting against the ground for long periods or in cold weather, improving the performance of the tire even after periods without use. Where the stronger braided material does not set, the tire does not have flat spots. Thus, such a tire may provide improved performance upon starting a vehicle. The materials may be used in various tires, including high speed, truck, and passenger tires.

Various embodiments include cords formed by strands of material that are braided together. Particularly, the material used is substantially non-elastic. The braided material may include, but is not limited to, fiberglass filaments or steel. Braiding the material allows for elongation not inherent in the material. The braids are defined by stitches of the material strands crossing over each other. The braided material in a relaxed form is shorter than the individual strands used in the braid and may be stretched to provide more length. Thus, when applied to an inner tire that is inflated, the braided material may elongate and expand with the tire tread.

After the material is braided into a cord, the cord may be further coated to increase tack so that the cord adheres appropriately to a rubber tire. Alternatively, the braided strands may be individually treated before braiding to provide sufficient tack. The coating may be any material that increases the tack of material coated therein, including a cement or rubber material. The additional tack value added by a coating may not be necessary for some materials that have a tack value that allows for adhesion to a tire. Fiberglass strands are individually treated to provide improved handling. Fiberglass strands may cut themselves when tied in a knot and are thus individually coated to prevent such tears. The treated fiberglass strands have a tack that may be sufficient to apply to a rubber tire. Steel may also be treated to improve the tack of the steel and a steel braid.

After any coatings are applied, the cord may be spirally wound on a drum before it is used for tire production. Alternatively, the cord may be extruded with additional cords to form a sheet. The sheet of cords may include 3 to 8 cords. Further embodiments may include 5 to 6 cords. The extruded cords may form a sheet that is from about 10 mm to about 15 mm wide. Further embodiments may include a sheet that is about 12 mm wide. A wider sheet of cords may also be formed as complete belt layer.

To introduce elongation, various embodiments include braided cords. A braided cord of substantially non-elastic threads allows for some elongation upon inflation of a tire as the braid is stretched. The amount of elongation may be controlled by the number of stiches per cm in the cord. A braid is made by the crossing of yarn strands in alternating patterns. A stitch is created where a strand crosses over other strands. A higher number of stitches per cm in a braid corresponds to a tighter braid and lower elongation. A looser braid has fewer stitches per cm and will have greater elongation as there is more slack in the braid to be elongated. A cord can have various numbers of stitches per cm. In an embodiment, the cord has about 1 to about 5 stiches per cm. In another embodiment, the cord has about 1 to about 3.14 stitches per cm.

Various materials may be braided together. Particularly, various embodiments include substantially non-elastic materials which provide strength to a tire. For example, the cord may be formed from fiberglass filaments or steel. Fiberglass and steel individual strands are not substantially elastic and would not substantially elongate as an individual strand during tire production. Braiding the substantially non-elastic materials provides the elongation that is otherwise missing.

In use, the cord fits between the tire tread and lower belt plies. In various embodiments, the cord covers the edges of belt plies. The cords may be placed together or with space therebetween. The cords may be various widths depending on the number of strands of yarn and how tight the braid is made.

Various embodiments may include any number of strands of yarn in a single cord. For example, the cords may include 3 or 4 strands of yarn. The cords may be put through an extruder to form a wider cord. In various embodiments, the extruded cords have a width of about 10 mm to about 15 mm. In another embodiment the width of the extruded cords may be about 12 mm. Braided cords may be evenly spaced through an extruder, which can then be placed more easily on a tire. In various embodiments, the cords may form a cap ply which extends across the belt ply, covering both opposing edges.

The braided material provides an improved production process. The braided cord may be used in a tire as the cap ply without further weaving; however, the braided cord may be woven. In various embodiments, the cord is not woven and does not need to be further treated or cut into strips to a width suitable for use in a tire. The cords may be laid on the tire form individually or as an extruded sheet. Multiple cords may be laid down in groups on a tire form. Tension may be applied to the cords placed on a tire; however, the tension applied does not fully elongate the cords when applied. The extruded cords may be twisted onto the tire as well.

Various embodiments have improved performance with respect to flat spotting. Materials such as nylon set and may flatten when a car sits in place over a period, which is known as flat spotting. Cords that are stiffer may not set and flatten the tire. Particularly, fiberglass and steel do not set and may avoid flat spotting that typically occurs with a nylon cap ply. The stiffer material may also improve the tire performance and longevity. The retreadability of the tire will be improved with the longer life of the tire. A reduced number of cord ends present in the tire may improve uniformity and use at high speed. The number of braided cords in the tire correlates to the number of cord ends. Fewer cord ends are lighter weight and easier to apply to a tire.

Braiding substantially non-elastic materials, such as fiberglass and steel, provides elongation during tire production. The inner tire expands and elongates with tire inflation and materials that elongate as desired. Strong materials are also desired to provide strength and durability to the tire. Braiding the stronger materials provides elongation and improved use of those materials in an inner tire.

Referring now to the drawings, in which like numerals refer to like components or steps, there are disclosed a broad aspect of an exemplary embodiments. FIG. 1 is a cutaway view of a pneumatic tire showing the placement of the layer adjacent to a tire tread. The tire tread 1 is the most outer layer of the tire. Belt plies 3 below the tread helps to keep the tire shape and reinforces the tire treads 1. Edge covers 2 are positioned over the belt ply ends and between the belt ply 3 and the tire tread 1. Edge covers 2 reduce sheer stress at high speeds and improve tread durability. Alternative tires may include a cap ply of the braided material that extends from one edge of the belt ply 3 to the opposite edge of the belt ply 3.

FIG. 2 is a perspective view of a braided cord. Strands of yarn 21, 22, 23 cross over one another to form a braided cord. Various embodiments include strands of yarn 21, 22, 23 that are fiberglass or steel strands. The braided cord may be coated with a rubber or cement material to increase tack for adhesion to a tire.

FIG. 3 shows a sheet 31 of braided cords 32. The braided cords 32 may be extruded to form a single sheet 31 having more than one cord 32. A sheet 31 may include any number of cords and may be of various widths. The sheet 31 may be an edge cover 2 or may be the width of a belt ply across the inner tire. The braided cords 32 may be spaced evenly in the sheet 31 when extruded together. During tire production, various embodiments of the sheet 31 may be twisted when placed in the inner tire.

Figure 4:
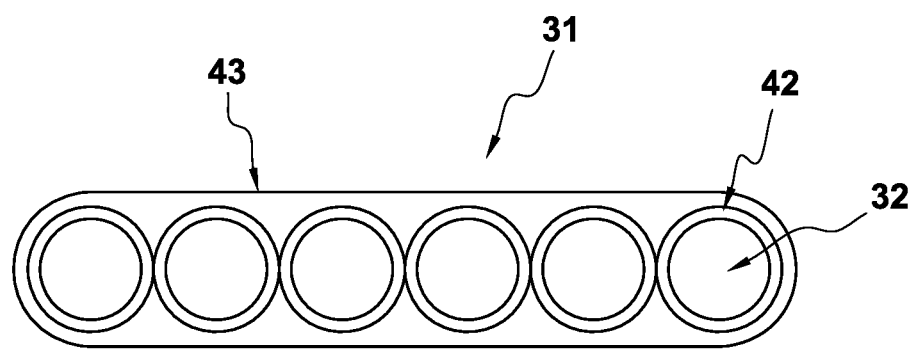
FIG. 4 shows a cutaway view of a sheet of braided cords.

FIG. 4 shows a cutaway view of a sheet 31 of braided cords 32. The braided cords 32 may be coated with a rubber or cement material 42 to increase the tack of the cord 32. The cords 32 are coated with the rubber or cement material 42 after individual strands of yarn have been braided together to form the cords 32. Where the cords 32 are extruded to form a sheet 31, the extrusion will apply a rubber layer 43 around the cords 32. The sheet 31 may then be applied to a tire or twisted onto a tire.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be affected while remaining within the spirit and scope of the invention. Accordingly, the foregoing disclosure, description, and figures are for illustrative purposes only and do not in any way limit the invention, which is defined only by the claims.

What is claimed is:

1. A pneumatic tire comprising:
   a tread;
   at least one layer adjacent to the tread, wherein the layer comprises at least one cord;
   the at least one cord comprising a braid comprising a plurality of braided strands of yarn of a substantially non-elastic material, wherein the braided strands of yarn cross each other in alternating, opposing directions, and
   the braid is characterized by having from about 1 to about 5 stitches per cm.

2. A pneumatic tire of claim 1 wherein the layer is a cap ply.

3. A pneumatic tire of claim 1 wherein the layer is at least one edge cover.

4. A pneumatic tire of claim 1 wherein the braided strands of yarn are fiberglass filaments.

5. A pneumatic tire of claim 1 wherein the braided strands of yarn are steel.

6. A pneumatic tire of claim 1 wherein the cord is coated with a cement or a rubber composition.

7. A pneumatic tire of claim 1 wherein the cord includes 3 or 4 braided strands of yarn.

8. A pneumatic tire of claim 1, wherein the braid is characterized by having from about 1 to about 3.14 stitches per cm.

9. A pneumatic tire of claim 1 wherein the cord is not woven.

10. A pneumatic tire of claim 1 wherein the cord is extruded with an additional cord.

11. A pneumatic tire of claim 10 wherein from 3 to 8 cords are extruded together.

12. A pneumatic tire of claim 11 wherein from 5 to 6 cords are extruded together.

13. A pneumatic tire of claim 10 wherein the extruded cords have a width from about 10 mm to about 15 mm.

14. A pneumatic tire of claim 13 wherein the extruded cords have a width of about 12 mm.

15. A pneumatic tire comprising:
   a tread;
   at least one layer adjacent to the tread, wherein the layer comprises at least one cord;
   the at least one cord comprising a braid and a coating covering the braid;
   the braid comprising a plurality of braided strands of yarn of a substantially non-elastic material, wherein the braided strands of yarn cross each other in alternating, opposing directions, wherein:
   the braid is characterized by having from about 1 to about 5 stitches per cm; and
   each stitch is formed when one of the braided strands of yarn crosses over other braided strands of yarn.

* * * * *